US012248269B2

(12) United States Patent
Hirose et al.

(10) Patent No.: US 12,248,269 B2
(45) Date of Patent: Mar. 11, 2025

(54) IMAGE FORMING APPARATUS CONFIGURED TO DETERMINE WHETHER OR NOT A ROLLER MEMBER HAS BEEN REPLACED

(71) Applicant: CANON KABUSHIKI KAISHA, Tokyo (JP)

(72) Inventors: Masaki Hirose, Kanagawa (JP); Masahide Hirai, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/119,972

(22) Filed: Mar. 10, 2023

(65) Prior Publication Data

US 2023/0288858 A1 Sep. 14, 2023

(30) Foreign Application Priority Data

Mar. 11, 2022 (JP) ................................ 2022-038208
Dec. 15, 2022 (JP) ................................ 2022-200574

(51) Int. Cl.
*G03G 15/00* (2006.01)
*G03G 15/16* (2006.01)

(52) U.S. Cl.
CPC ......... *G03G 15/553* (2013.01); *G03G 15/168* (2013.01); *G03G 15/5037* (2013.01)

(58) Field of Classification Search
CPC ......................... G03G 15/553; G03G 15/5037
See application file for complete search history.

(56) References Cited

U.S. PATENT DOCUMENTS 9,298,120 B2 3/2016 Hano et al.
9,442,409 B2 9/2016 Hano et al.
10,185,254 B2 1/2019 Hirai et al.
10,527,977 B2 1/2020 Harashima
11,454,898 B2 9/2022 Yoshida et al.
2009/0317096 A1* 12/2009 Odaira ............... G03G 15/6529 399/21

(Continued)

FOREIGN PATENT DOCUMENTS

JP H05107834 A * 4/1993
JP 3078459 B2 * 8/2000

(Continued)

OTHER PUBLICATIONS

Translation of JP-H05107834-A (Year: 1993).*
Translation of JP-3078459-B2 (Year: 2000).*

*Primary Examiner* — Arlene Heredia
(74) *Attorney, Agent, or Firm* — Venable LLP

(57) ABSTRACT

An image forming apparatus includes a replaceable roller member, an applying unit that applies voltage to the roller member, a current detecting unit that detects a current flowing in the roller member to which the voltage is applied, and a controlling unit. The controlling unit calculates a value of a slope of a current-voltage characteristic of the roller member on the basis of a first current detected when a first voltage is applied to the roller member and a second current that is detected when a second voltage is applied, and determines whether or not the roller member has been replaced on the basis of an amount of change from a value of a first slope calculated at a first timing and a value of a second slope calculated at a second timing later than the first timing.

4 Claims, 12 Drawing Sheets

(56) References Cited

U.S. PATENT DOCUMENTS

2018/0004139 A1* 1/2018 Yamada ............ G03G 15/5037

FOREIGN PATENT DOCUMENTS

| | | | | | |
|---|---|---|---|---|---|
| JP | 2003-195700 | A | | 7/2003 | |
| JP | 2014-102299 | A | | 6/2014 | |
| JP | 2015-068974 | A | | 4/2015 | |
| JP | 2018004821 | A | * | 1/2018 | ......... G03G 15/0152 |
| JP | 2019-159132 | A | | 9/2019 | |
| JP | 2021-001995 | A | | 1/2021 | |

* cited by examiner

IMAGE FORMING APPARATUS CONFIGURED TO DETERMINE WHETHER OR NOT A ROLLER MEMBER HAS BEEN REPLACED

BACKGROUND OF THE INVENTION

Field of the Invention

The present invention relates to an image forming apparatus.

Description of the Related Art

Conventionally, electrophotographic image forming apparatuses have included image forming apparatuses in which a toner image is transferred directly from a photosensitive member to a transfer material, and also image forming apparatuses of intermediate transfer type in which a toner image having undergone primary transfer from a photosensitive member to an intermediate transfer belt is then secondary-transferred to the transfer material, and the resulting image is outputted.

Transfer voltage is applied to a transfer roller at the time of image formation in these image forming apparatuses. As a result of voltage application, the resistance value of the transfer roller changes irreversibly as the apparatus is used over time. When the resistance value of the transfer roller changes to or above a predetermined value a concern arises in that defective transfer may occur and images fail to be formed satisfactorily, even upon application of a set transfer voltage.

It has therefore been proposed to issue a notification prompting replacement of the transfer roller when it is determined that the lifetime of the transfer roller has ended. The lifetime of the transfer roller can be determined, for example, in accordance with a method in which the lifetime is set beforehand for instance on the basis of a number of prints and/or a total rotation time, or a method in which a resistance value of the transfer roller is measured and the lifetime of the transfer roller is determined to be over in a case where the measured resistance value lies outside a predetermined allowable range.

The measurement of the resistance value of a transfer roller or the like is influenced by the environment, for instance in terms of temperature and humidity. Therefore, Japanese Patent Application Publication No. 2003-195700 proposes a scheme in which a resistance value is measured with good precision on the basis of a resistance value of a transfer roller, detected by a resistance detection means, and on the basis of environment information detected by an environment detection means.

In Japanese Patent Application Publication No. 2019-159132, a resistance value is detected at a time where two or more levels of current or voltage are switched to and applied to a member such that the electrical characteristics of the resistance value of the member change with energization. A scheme is also proposed in which a state of deterioration is determined through calculation of the slope of a current-voltage characteristic on the basis of a detected resistance value, to determine the lifetime of a member.

SUMMARY OF THE INVENTION

Herein it is possible to automatically detect that a replacement has been carried out, once the member has been replaced by a user, in a case where the image forming apparatus has a replacement detection mechanism which detects whether or not a member has been replaced that has had the end of the lifetime thereof notified to the user. As a result, the member lifetime that is being counted in the image forming apparatus for purposes of management can be reset, whereupon the lifetime of the member after replacement can start being counted anew. In the absence of a replacement detection mechanism, on the other hand, the user has to manually reset the lifetime after replacement of the member, for instance by operating an operation panel. A problem arises however in that, if the user forgets to perform that operation and the lifetime is not reset, then the lifetime cannot be calculated correctly, since in that case the lifetime of the member after replacement is not counted properly.

It is thus an object of the present invention, arrived at in the light of the above issues, to provide a technology for determining accurately whether a member of an image forming apparatus has been replaced or not, even in the absence of a replacement detection mechanism.

The present invention provides an image forming apparatus, comprising:

a replaceable roller member;

an applying unit configured to apply a voltage to the roller member;

a current detecting unit configured to detect a current flowing in the roller member to which the voltage is applied; and a controlling unit capable of calculating a value of a slope of a current-voltage characteristic of the roller member, on the basis of a first current detected when a first voltage is applied to the roller member, and a second current detected when a second voltage is applied to the roller member, Wherein the controlling unit is configured to determine whether or not the roller member has been replaced, on the basis of an amount of change from a value of a first slope calculated at a first timing, and a value of a second slope calculated at a second timing later than the first timing.

Further features of the present invention will become apparent from the following description of exemplary embodiments with reference to the attached drawings.

DESCRIPTION OF THE EMBODIMENTS

Figure 1:
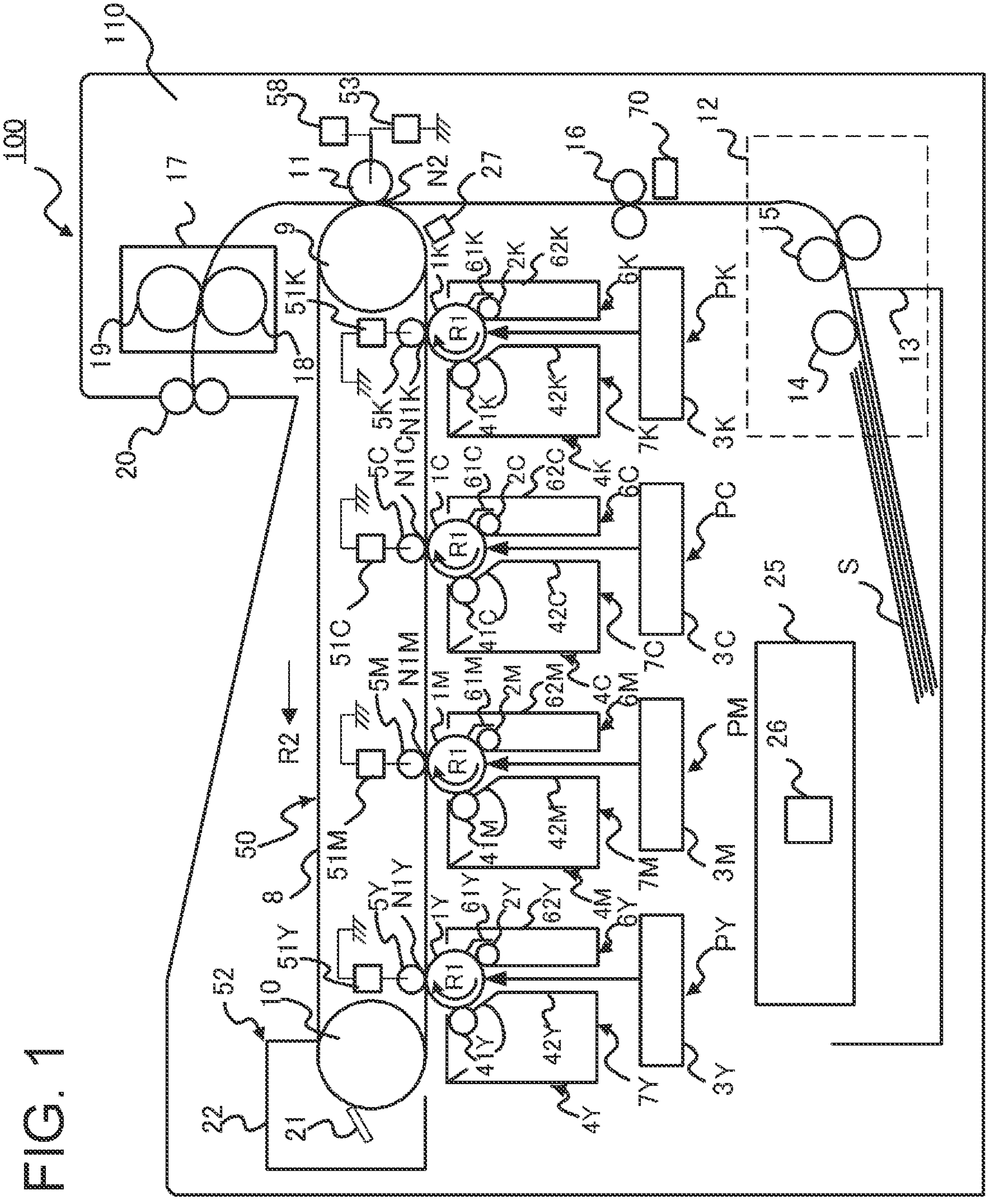
FIG. 1 is a schematic cross-sectional diagram of an image forming apparatus according to one embodiment.

Preferred embodiments of the present invention will be explained in detail below, by means of examples, with reference to accompanying drawings. However, the dimensions, materials, shapes, relative arrangement and so forth, of constituent components described in the embodiments below are to be modified as appropriate in accordance with the apparatus to which the present invention is to be applied, and depending on various conditions. Unless specifically noted otherwise, therefore, the scope of the present invention is not meant to be limited by any of the foregoing.

Although multiple features are described in the embodiments, not all of these features are essential to the invention, and multiple features may be combined arbitrarily. In the accompanying drawings, moreover, identical or similar elements will be denoted by identical reference numerals, and a recurrent explanation thereof will be omitted.

Embodiment 1

I. Overall Configuration of Image Forming Apparatus

FIG. 1 is a schematic cross-sectional diagram of an image forming apparatus according to one embodiment of the present embodiment. An image forming apparatus 100 of the present embodiment is a tandem-type image forming apparatus (laser beam printer), relying on an intermediate transfer scheme, that forms full-color images utilizing an electrophotographic system. The image forming apparatus aimed at by the present invention is not limited thereto, and the present invention can be applied to various image forming apparatuses, such as copiers, and printers that utilize an electrophotographic system or an electrostatic recording system.

The image forming apparatus 100 has first, second, third and fourth image forming units PY, PM, PC, PK as a plurality of image forming units. The first, second, third and fourth image forming units PY, PM, PC, PK form yellow (Y), magenta (M), cyan (C) and black (K) toner images, respectively. In the present embodiment the configuration and operation of the image forming units PY, PM, PC, PK are substantially identical, except that the colors of the respective toners that are used are different. Unless a particular distinction is called for, therefore, the elements will be explained collectively omitting the suffixes Y, M, C, K in reference symbols denoting elements for any of the colors.

Each image forming unit P has a drum-type electrophotographic photosensitive member (photosensitive member), i.e., a photosensitive drum 1, as an image bearing member.

The photosensitive drum 1 is rotationally driven, in the direction of arrows R1 in the figure, by a driving means (not shown). Around the photosensitive drum 1 there are disposed, in the rotation direction thereof, a primary charging roller 2 as primary charging means made up of a roller-type charging member, an exposure device (laser unit) 3 as an exposure means (image writing means), and a developing apparatus 4 as a developing means. There are next disposed a primary transfer roller 5 as a first transfer roller and a drum cleaner 6 as photosensitive member cleaning means.

The developing apparatus 4 has a developing roller 41 as a developer carrier and a toner container 42 that accommodates toner as a developer. The drum cleaner 6 has a drum cleaning blade 61 as a cleaning means, and a waste toner container 62.

An intermediate transfer belt 8 as an intermediate transfer member is spanned by a driver roller 9 and a tension roller 10, and is rotationally driven in the direction of arrow R2 in the drawing, through transmission of a driving force to the driver roller 9.

The primary transfer roller 5 is pressed against the photosensitive drum 1 via the intermediate transfer belt 8. The primary transfer roller 5 and the photosensitive drum 1 are in contact with each other across the intermediate transfer belt 8, thereby forming a primary transfer portion (primary transfer nip) N1.

A secondary transfer roller 11 as a second transfer roller is disposed at a position opposing the driver roller 9, on the outer peripheral surface side of the intermediate transfer belt 8. The secondary transfer roller 11 is pressed against the driver roller 9 across the intermediate transfer belt 8. The secondary transfer roller 11 and the driver roller 9 are in contact with each other across the intermediate transfer belt 8, thereby forming a secondary transfer portion (secondary transfer nip) N2. In the present embodiment the driver roller 9 also serves as a counter roller to the secondary transfer roller.

A belt cleaner 52 as an intermediate transfer belt cleaning means is disposed at a position opposing the tension roller 10 on the outer peripheral surface side of the intermediate transfer belt 8. The belt cleaner 52 has a belt cleaning blade 21 as a contact member, and a waste toner container 22.

A replaceable intermediate transfer belt unit 50 is, for instance, made up of the primary transfer roller 5, the intermediate transfer belt 8, the driver roller 9, the tension roller 10 and the belt cleaner 52.

In the present embodiment, the photosensitive drum 1, the charging roller 2, the developing apparatus 4 and the drum cleaner 6 integrally form a process cartridge 7 in each image forming unit P. Each process cartridge 7Y, 7M, 7C, 7K is attachable/detachable to/from an apparatus body 110 of the image forming apparatus 100.

In the present embodiment, the configurations of the process cartridges 7Y, 7M, 7C, 7K are substantially identical, with the toners accommodated in toner containers 42Y, 42M, 42C, 42K of different colors, namely, yellow (Y), magenta (M), cyan (C) and black (K), respectively.

A control board 25 having mounted thereon an electrical circuit for controlling the image forming apparatus 100 is provided in the image forming apparatus 100. The control board 25 has mounted thereon a CPU 26 as controlling unit. The CPU 26, which operates according to programs and user instructions, collectively controls the operation of the image forming apparatus 100 as pertains to the totality of image formation. The CPU 26 controls the operation of the apparatus on the basis of signals, for example, from a drive controlling unit of, for instance, drive sources pertaining to transport of a transfer material S, the intermediate transfer belt 8, and the drive sources of the image forming units P, as well as an applying unit which controls the voltage applied at the time of image formation, a current detecting unit, and a temperature/humidity sensor (environment sensor) that detects environment information such as temperature and humidity. The control board 25 has a memory as a storage unit.

2. Transfer Configuration

A configuration pertaining to primary transfer and secondary transfer in the present embodiment will be explained in further detail next. In the present embodiment, an intermediate transfer belt 8, the size of which can easily be reduced, is used as the intermediate transfer member.

The intermediate transfer belt 8 is an endless belt imparted with conductivity through addition of a conductive agent to a resin material. The intermediate transfer belt 8 is spanned around two shafts, namely, those of the driver roller 9 and of the tension roller 10, such that a total tension of 100 N is applied by the tension roller 10. As the intermediate transfer belt 8 of the present embodiment, there was used an endless belt having a thickness of 70 μm and made up of a polyimide resin, the volume resistivity of which was adjusted to 1×10E10 Ω·cm, as a result of having mixed thereinto carbon as a conductive agent.

The volume resistivity range of the intermediate transfer belt 8 ranges preferably from 1×10E9 to 10E11 Ω·cm, from the viewpoint of transferability. When the volume resistivity is lower than 1×10E9 Ω·cm, defective transfer may occur that derives from escaping transfer current in a high-temperature, high-humidity environment. When by contrast the volume resistivity is higher than 1×10E11 Ω·cm, defective transfer may occur that derives from abnormal discharge in a low-temperature, low-humidity environment.

The volume resistivity of the intermediate transfer belt 8 is worked out in accordance with the following measuring method. Specifically, volume resistivity is measured using Hiresta-UP (MCP-HT450) by Mitsubishi Chemical Corporation and using UR as a measurement probe, with room temperature at the time of measurement set to 23° C. and room humidity set to 50%, and under conditions of applied voltage of 250 V and measurement time of 10 seconds.

In the present embodiment a polyimide resin is used as the material of the intermediate transfer belt 8, but the material of the intermediate transfer belt 8 is not limited thereto. For instance, other materials such as those below may be used, so long as the material is a thermoplastic resin. For instance, materials such as polyesters, polycarbonates, polyarylates, acrylonitrile-butadiene-styrene copolymers (ABS), polyphenylene sulfide (PPS), polyvinylidene fluoride (PVdF) and polyethylene naphthalate (PEN), as well as mixed resins of the foregoing, can be used.

An electron-conductive intermediate transfer belt that uses carbon as a conductive agent is utilized herein, but also an ion-conducting conductive agent may be utilized as the conductive agent. Examples of ion-conducting conductive agents include polyvalent metal salts and quaternary ammonium salts. Quaternary ammonium salts include tetraethylammonium ions, tetrapropylammonium ions, tetraisopropylammonium ions, tetrabutylammonium ions, tetrapentylammonium ions, tetrahexylammonium ions and the like, as the cation moiety, and for instance halogen ions, as well as fluoroalkyl sulfate ions, fluoroalkyl sulfite ions and -fluoroalkylborate ions having 1 to 10 carbon atoms in the fluoroalkyl group, as the anion moiety.

A polyether ester amide resin may be used, as the main component of the material, optionally with potassium perfluorobutanesulfonate or the like concomitantly added to the polyether ester amide resin.

The primary transfer roller 5 used in the present embodiment was an elastic roller, having an outer diameter of 12 mm, in which a nickel-plated steel rod having an outer diameter of 6 mm, as a core metal, was coated with an elastic layer in the form of a 3 mm thick foam sponge having, as main components, NBR and epichlorohydrin rubber, and having had the volume resistivity thereof adjusted to about 1×10E5 to 1×10E7 Ω·cm. The primary transfer roller 5 is brought into contact with the photosensitive drum 1 across the intermediate transfer belt 8, at a pressure of 9.8 N, and rotates along with the rotation of the intermediate transfer belt 8. Further, DC voltage (primary transfer voltage) of about 1000 to 2000 V is applied to the primary transfer roller 5 during primary transfer of toner on the photosensitive drum 1 to the intermediate transfer belt 8.

As the secondary transfer roller 11 there was used an elastic roller having an outer diameter of 16 mm and in which a nickel-plated steel rod having an outer diameter of 8 mm, as a core metal, was coated with an elastic layer in the form of a 4 mm thick foam sponge having, as main components. NBR and epichlorohydrin rubber, and having had the volume resistivity thereof adjusted to about 1×10E7 to 1×10E8 Ω·cm.

The secondary transfer roller 11 is brought into contact with the intermediate transfer belt 8 at a pressure of 50 N, and rotates along with the rotation of the intermediate transfer belt 8. Further, DC voltage (secondary transfer voltage) of about 1000 to 5000 V is applied to the secondary transfer roller 11 at the time of secondary transfer of toner on the intermediate transfer belt 8 to the transfer material S such as paper.

These values are to be set optimally for instance depending on the belt materials, roller materials, apparatus configuration and so forth, and are not limited to the present configuration and the values herein.

3. Image Formation Process in Image Forming Apparatus

The image formation process in the image forming apparatus of the present invention will be explained next. At the time of image formation, the outer peripheral surface of the rotating photosensitive drum 1 is charged to a predetermined potential of predetermined polarity (negative polarity in the present embodiment) by the primary charging roller 2 to which there is applied a primary charging voltage of predetermined polarity (negative polarity in the present embodiment). Thereafter, the charged surface of the photosensitive drum 1 is exposed by the laser unit 3, on the basis of an image signal. An electrostatic latent image (electrostatic image) becomes formed as a result on the photosensitive drum 1.

This electrostatic latent image is developed (made visible) in the form of a toner image by the developing apparatus 4, using toner as a developer. At this time, a developing voltage of predetermined polarity (negative polarity in the present embodiment) is applied to the developing roller 41. In the present embodiment, a toner image becomes formed on the photosensitive drum 1 through image exposure and reversal development. After uniform charging processing, specifically, a toner image is formed by causing toner, having been charged to the same charging polarity as that of the photosensitive drum 1, to adhere to an exposed portion, on the photosensitive drum 1, the absolute value of potential of which has decreased as a result of exposure. In the present embodiment, the toner used for development is negatively charged. That is, the charging polarity (regular charging polarity) of the toner during development is negative.

The toner image formed on the rotating photosensitive drum 1 as described above is brought into contact with the photosensitive drum 1 at the primary transfer portion N1, and is transferred (primary transfer) onto the intermediate transfer belt 8 which is rotating at substantially the same speed as that of photosensitive drum 1. At this time a primary transfer voltage of reverse polarity (positive polarity in the present embodiment) to the charging polarity of the toner at the time of developing is applied, to the primary transfer roller 5, from a primary transfer voltage power supply (high-voltage power supply) 51 as a primary transfer voltage applying unit.

A target current value such that optimal image formation is achieved is set beforehand for this primary transfer voltage, and transfer voltage is controlled by a high-voltage controlling unit so that the target current is achieved before the toner image formed on the photosensitive drum 1 reaches the primary transfer portion N1. In a series of image formation processes, pre-rotation in primary transfer is defined as the period from the point in time at which the photosensitive drum starts rotating until just before the start of transfer of the toner image onto the intermediate transfer belt upon arrival, at the transfer portion, of the toner image on the photosensitive drum. Transfer voltage control performed at this time is referred to as ATVC (Auto Transfer Voltage Control).

At the time of formation of a full-color image, the toner images formed on respective photosensitive drums 1Y, 1M, 1C and 1K of the first, second, third and fourth image forming units PY PM, PC, PK are sequentially transferred, onto the intermediate transfer belt 8, so as to be superimposed on each other. The toner images of four colors, superimposed on each other, are transported in that state up to the secondary transfer portion N2, as a result of the rotation of the intermediate transfer belt 8.

Meanwhile, the transfer material S such as a recording paper fed from a feeding and transport device 12 is transported up to the secondary transfer portion N2 by a registration roller pair 16. The feeding and transport device 12 has a paper feeding transport roller 14 that feeds the transfer material S from a cassette 13 in which the transfer material S is accommodated, and a transport roller pair 15 that transports the transfer material S having been fed. The transfer material S transported from the feeding and transport device 12 is conveyed to the secondary transfer portion N2, by the registration roller pair 16, so as to be in synchrony with the toner image on the intermediate transfer belt 8.

At the secondary transfer portion N2, the toner image on the intermediate transfer belt 8 is transferred (secondary transfer) onto the transfer material S that is nipped and conveyed between the intermediate transfer belt 8 and the secondary transfer roller 11. At this time, secondary transfer voltage of reverse polarity (positive polarity in the present embodiment) to the charging polarity of the toner at the time of development is applied, to the secondary transfer roller 11, from a secondary transfer voltage power supply 53 (high-voltage power supply) as a secondary transfer voltage applying unit.

As in the case of the primary transfer voltage control, also a target current value is set beforehand for the secondary transfer voltage such that optimal image formation is achieved. Pre-rotation in secondary transfer is defined as the period from the point in time, in a series of image forming operation processes, at which the photosensitive drum starts rotating until just prior to the start of transfer of the toner image onto the transfer material upon arrival of the toner image at the secondary transfer portion N2. Through execution of transfer voltage control (ATVC) in the secondary transfer portion during pre-rotation in secondary transfer, the transfer voltage is controlled, by the high-voltage controlling unit, so that the target current is achieved at the time of image formation.

The transfer material S having had the toner image transferred thereonto is transported to a fixing apparatus 17 as fixing means. The transfer material S is nipped and transported by a fixing film 18 and a pressure roller 19 of the fixing apparatus 17, and is thereby heated and pressed, as a result of which the toner image becomes fixed to the surface of the transfer material S. The transfer material S having had the toner image fixed thereto is discharged out of the apparatus body 110 by a discharge roller pair 20.

Toner (primary untransferred toner) remaining on the surface of the photosensitive drum 1 after the primary transfer process is cleaned by the drum cleaner 6. Specifically, the primary untransferred toner is scraped from the rotating photosensitive drum 1 by a drum cleaning blade 61 disposed in contact with photosensitive drum 1, and is collected in the waste toner container 62.

4. Lifetime Detection Means

A lifetime detection means used in the present embodiment will be explained next. The secondary transfer roller 11 will be explained herein as an example of a replaceable member.

At the time of the above secondary-transfer image formation, the controlling unit calculates a resistance value of the secondary transfer roller 11 from the value of the voltage of the high-voltage controlling unit and the value of detected current obtained by the current detecting unit. The lifetime of the secondary transfer roller 11 is determined through detection of variation in the calculated resistance value. Specifically, the controlling unit detects the current at each timing that meets a predetermined condition, calculates a resistance value, and stores the resistance value in a data storage means (memory) in the image forming apparatus, to detect as a result the change over time of the resistance value relative to the number of prints.

In the present embodiment, the timing at which the predetermined condition is met is the timing (so-called "first thing in the morning") at which the operation has been stopped for eight or more hours after a job was over, and the secondary transfer roller 11 has cooled down to a cold state. The current detecting unit may be, for instance, an ammeter 58; herein the ammeter 58 and a controlling unit that controls the ammeter 58 may be regarded as the current detecting unit.

Figure 2:
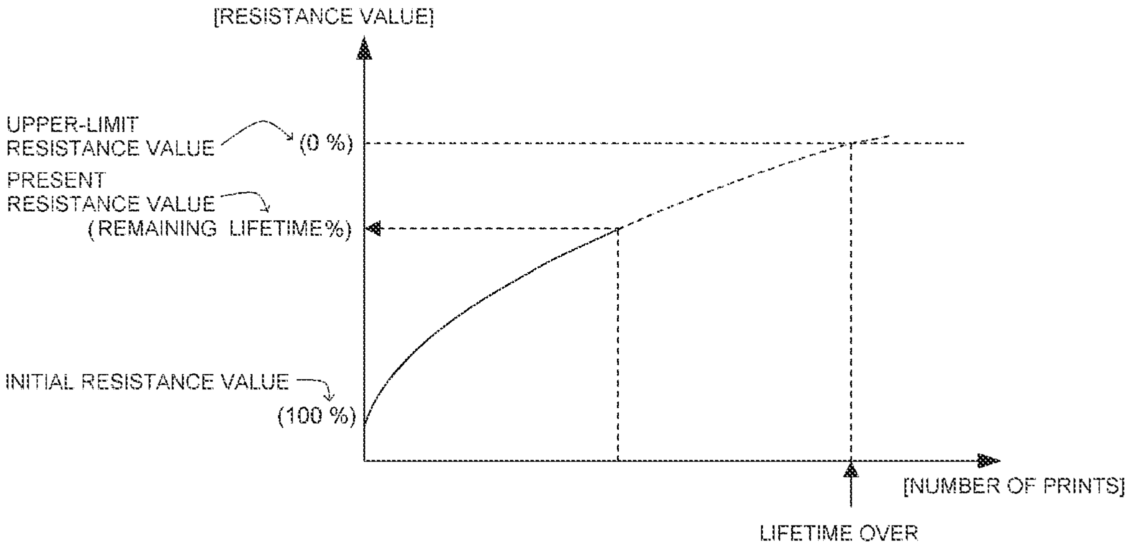
FIG. 2 is a diagram for explaining a relationship between a detected resistance value and member lifetime in one embodiment.

FIG. 2 illustrates a variation in resistance value according to a durability print count (the number of prints) of the secondary transfer roller 11. The secondary transfer roller 11 used in the present embodiment is characterized in that the resistance value of the member increases on account of energization deterioration, over long periods of time, that accompanies durability. In the present embodiment an upper-limit resistance value of the secondary transfer roller 11 is set for the purpose of guaranteeing image quality. The controlling unit compares the calculated resistance value with the upper-limit resistance value, and determines that the lifetime of secondary transfer roller 11 has ended in a case where the upper-limit resistance value has been reached.

As illustrated in FIG. 2, 100% is set in the present embodiment as a remaining lifetime at the time of new-product resistance, at which the resistance value is the initial resistance value, and 0% is set as the remaining lifetime at the time of upper-limit resistance, at which the resistance value is the upper-limit resistance value. The controlling unit calculates the remaining lifetime as a percentage, by calculating a ratio between the upper-limit resistance value and the initial resistance value, at the position of a resistance value at present. The obtained lifetime is notified to the user by way of a screen or the like. The lifetime notification method is not limited thereto, and for instance a configuration may be adopted in which a warning is notified only once the lifetime ends.

In the present embodiment, detection of an actual resistance value is performed upon execution of the above-described transfer voltage control (ATVC) at the time of pre-rotation in secondary transfer. The controlling unit calculates (Expression 1 below) a resistance value R from a voltage V that is applied at the time of pre-rotation, and a current I detected by the current detecting unit.

$$R=V/I \quad (1)$$

Preferably, also a correction expression is worked out beforehand by calculating a relationship between environment information such as temperature/humidity and absolute moisture content, and the resistance value, and by applying thereupon an environment correction to the resistance value. The relationship between environment information and resistance value may be worked out beforehand in the form of a resistance value correction table, the obtained relationship being then used for correction. The correction expression and table differ for instance depending on the material of the secondary transfer roller, apparatus configuration, process speed and so forth.

5. Replacement Detection Means

A replacement detection means used in the present embodiment will be explained next. In the present embodiment, the controlling unit calculates a slope of a current-voltage characteristic curve concurrently with execution of transfer voltage control (ATVC) at the time of image formation. The replacement state of the secondary transfer roller is determined through detection of the variation in the calculated slope. The controlling unit functions herein as the replacement detection means, but alternatively there may be provided a dedicated replacement detection means. The timing of image formation with slope detection is not particularly limited, and may be every time that an image is formed, or every predetermined number of prints, or every predetermined lapse of time.

A slope pertaining to the current-voltage characteristic will hereafter be referred to as "slope". Languages such as "large/small" and "increase/decrease" relating to the slope apply to an instance where the horizontal axis is voltage and the vertical axis is current, as in the graphs of the present embodiment. Herein a "large/small" slope signifies that the amount of increase in current with respect to the amount of increase in voltage in a same interval is "large/small". Although the slope of the current-voltage characteristic curve may in some instances be described as "large/small" for members such as rollers, the magnitude of the slope is however not absolute, but relative in a comparison of members involving mutually different durability conditions and/or initial characteristics. The slope can be said to be a value corresponding to a current-voltage characteristic of the secondary transfer roller 11, calculated on the basis of a first current detected upon application of a first voltage to the secondary transfer roller 11 and a second current detected upon application of a second voltage to the secondary transfer roller 11.

Figure 3:
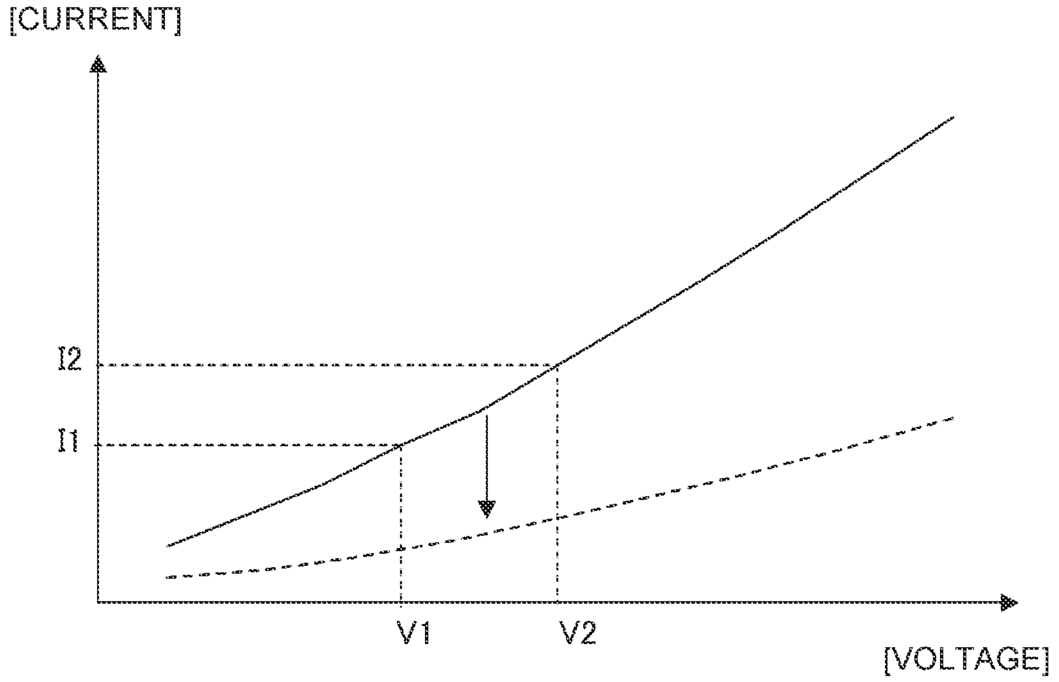
FIG. 3 is a diagram for explaining a current-voltage characteristic in one embodiment.

FIG. 3 is a graph illustrating the slopes of the above-described current-voltage characteristic curve for a new transfer roller and a durability transfer roller. The solid line in FIG. 3 denotes the slope in a new-product state, while the dashed line denotes the slope for a durability product. In the present embodiment, a slope K is defined as given below, and is calculated from detected currents 11, 12 upon application of voltages V1, V2 of two pre-set levels (expression 2 below).

$$K=(I2-I1)/(V2-V1)\ldots \quad (2)$$

As FIG. 3 reveals there is a significant difference between the slopes of new and durability products, with the slope of the durability product tending to be smaller than that of the new product.

Figure 4:
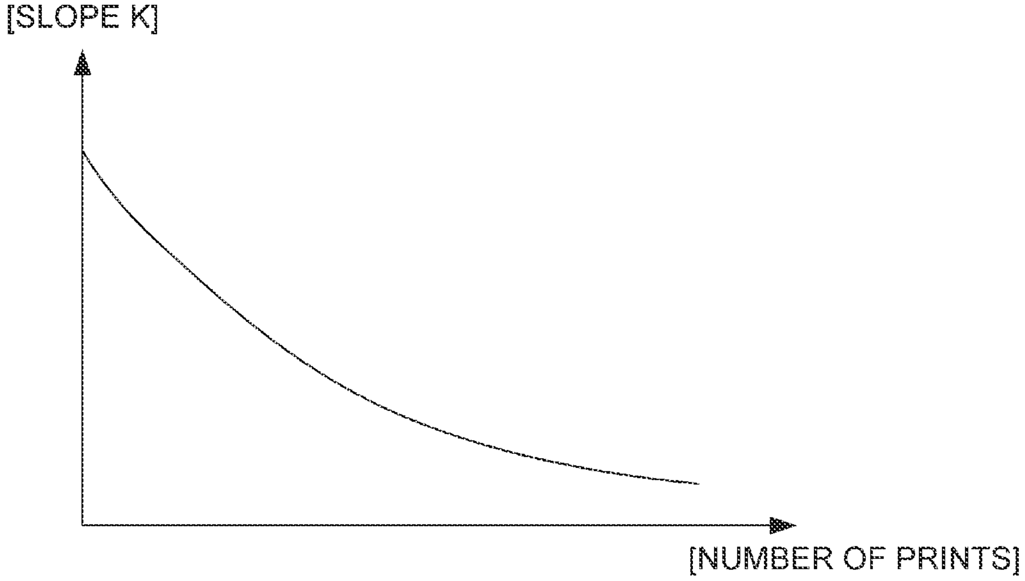
FIG. 4 is a diagram for explaining a relationship between number of prints and a current-voltage characteristic in one embodiment.

FIG. 4 is a graph illustrating the relationship between slope K and number of prints. The graph reveals that the slope K decreases (becomes smaller) as the number of prints increases. In other words, the amount of increase in detected current relative to the amount of increase in applied voltage becomes smaller as the number of prints rises from the new-product state.

Figure 5:
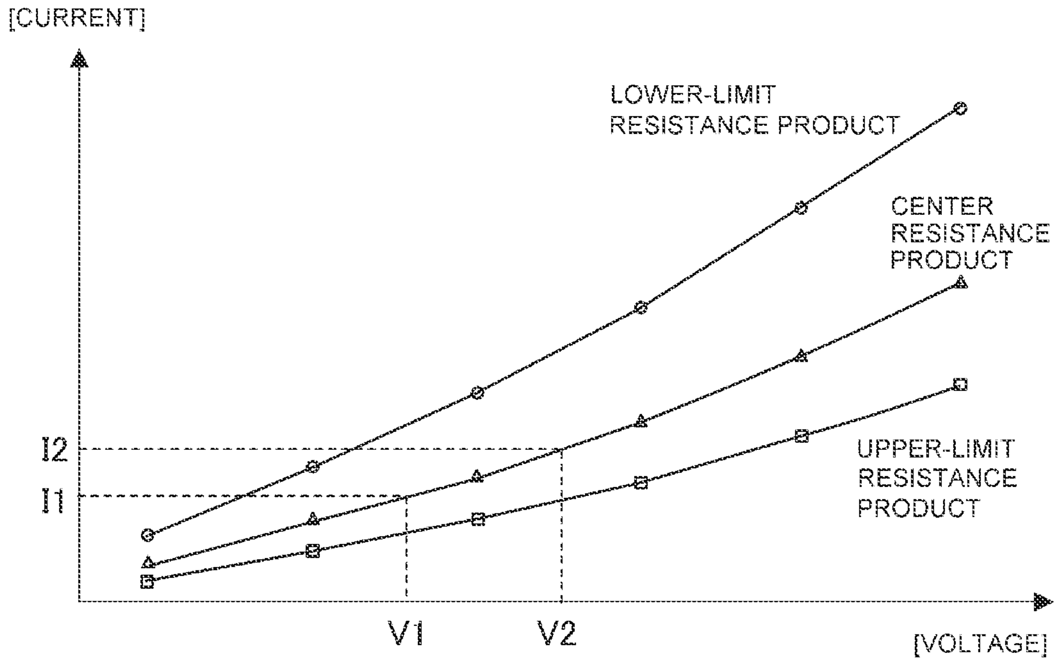
FIG. 5 is a diagram for explaining a relationship between roller tolerance and a current-voltage characteristic in one embodiment.

FIG. 5 is a diagram illustrating slopes for the secondary transfer roller 11 with different initial resistance values. Some manufacturing tolerance, as an allowable individual difference range, generally applies in the production of parts. Also, the resistance value of the secondary transfer roller 11 used in the present embodiment has a manufacturing tolerance defined by an upper limit and a lower limit. FIG. 5 illustrates the slopes of three secondary transfer rollers 11, namely, a secondary transfer roller 11 (upper-limit resistance product), the initial resistance value of which is the upper limit, of the range of manufacturing tolerance, a secondary transfer roller 11 (center resistance product), the initial resistance value of which is a center value, and a secondary transfer roller 11 (lower-limit resistance product), the initial resistance value of which is the lower limit. This reveals that also the slopes are different in a case where the initial resistance values are different, and that the slope becomes smaller as the initial resistance value at the time of manufacture increases.

A calculation example of the slope K for a case of a center resistance product will be illustrated herein. In the present embodiment, two levels of voltage V1, V2 are set as given below. The timings at which V1 and V2 are applied within the period of ATVC are not particularly limited, so long as measurements are possible, nor is the order of precedence of V1 and V2 limited.

V1=1000 V

V2=2000 V

The detected currents I1, I2 for the respective voltages were as follows,

I1=45 μA

I2=98 μA

Accordingly, Expression (2) yielded K=0.053 as an initial value of the slope of the center resistance product. Similarly, the initial value of the slope of the upper-limit resistance product was K=0.040. Further, the initial value of the slope of the lower-limit resistance product was K=0.085. The above reveals that the tolerance range that the initial value of the slope K can take on, within the range of the manufacturing tolerance of the resistance value of the transfer roller, ranges in turn from 0.040 to 0.085.

Figure 6:
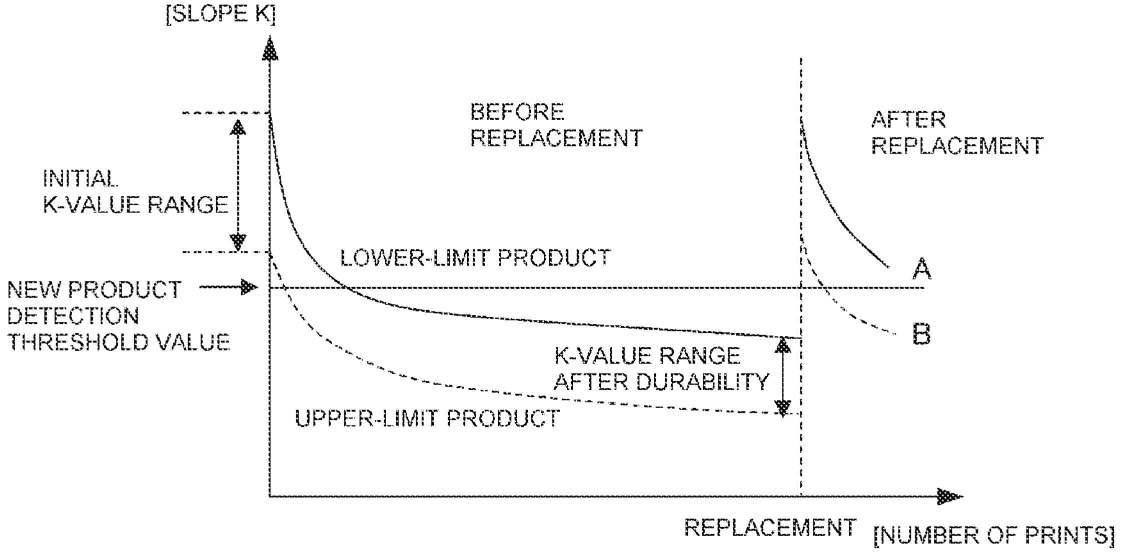
FIG. 6 is a diagram for explaining durability derived from changes in a current-voltage characteristic in one embodiment.

FIG. 6 is a diagram for explaining the transition in the slope K of the secondary transfer roller 11 on account of durability (increase in the number of prints), and for explaining the variation in slope K upon replacement of the roller once the lifetime thereof has ended.

The initial value of the slope K for a new product exhibits the above-described tolerance range (0.040 to 0.085) (initial K-value range). The slope K gradually decreases, on account of durability, as the number of prints increases. The solid lines denote a durability variation in the slope K for the case of a product with upper-limit resistance value, and the dashed lines denote the durability variation in the slope K in the case of a product with lower-limit resistance value. In the present embodiment, the range of slope K after durability (K-value range after durability) was from 0.015 to 0.030.

The slope K changes significantly when the secondary transfer roller 11 is replaced once the lifetime thereof has ended. The value of K after replacement by a new product returns from the temporarily decreased value to the initial value. The controlling unit of the present embodiment detects a change in the slope, to thereby determine that the transfer roller has been replaced.

A solid line A and a dashed line B in FIG. 6 denote slopes K after replacement, with the solid line A denoting replacement with a transfer roller having upper-limit resistance, and with dashed line B denoting replacement with a transfer roller having a lower-limit resistance. Hereafter, ΔK will refer to an amount of change of K being an amount of change from the value of the first slope calculated at a first timing to the value of the second slope calculated at a second timing.

A combination involving the smallest amount of change in K for a case where a transfer roller has been replaced is an instance in which a transfer roller with lower-limit resistance is replaced with a transfer roller B with upper-limit resistance. In this case the amount of change in K corresponds to a change from K=0.030 after durability of the transfer roller with lower-limit resistance to K=0.040 which is the initial value of the transfer roller B with upper-limit resistance. In other words, a difference between the upper limit (0.030) of the range (0.015 to 0.030) of the value that the slope can take on in a case where the secondary transfer roller 11 has reached the end of the lifetime thereof, and the lower limit (0.040) of the range (0.040 to 0.085) of the value that the slope can take on in a case where the secondary transfer roller 11 is new is deemed to be the minimum value of the amount of change ΔK.

In the present embodiment, therefore, a transfer roller is determined to have been replaced in a case where an amount of change ΔK≥0.010 is detected. Herein an amount of change ΔK=0.010 is a first threshold value. The secondary transfer roller 11 is determined to have been replaced when the slope change amount is equal to or greater than the first threshold value. The secondary transfer roller 11 is not determined to have been replaced when, on the other hand, the slope change amount is smaller than the first threshold value.

As described above, in the present embodiment it is possible to determine whether a roller has been replaced or not by determining whether or not the amount of change in the slope K is equal to or greater than a predetermined value, such that a lifetime count can be reset automatically in a case where replacement is detected. Various values used for control, such as the set value of applied voltage and the predetermined value of the amount of change in the slope K, may be established as appropriate for instance depending on the characteristics of the relevant member and the environment of the apparatus. The values, expressions, tables and so forth used for control may be calculated on the basis of the results of measurements performed beforehand, and may be stored for instance in the memory of the control board 25.

EMBODIMENT 2

Embodiment 2 will be explained next. Roller replacement may involve in some instances replacement not with a new roller, but with another transfer roller having a history of being used. Also, in this case, an amount of change ΔK≥0.010 may be detected depending on the operating state of the apparatus prior to replacement, and/or the state of the transfer roller at the time of detection. Even if replacement of the transfer roller can be detected in that case, it is, however, difficult to accurately determine whether the transfer roller has been replaced with a new one. A concern arises in this case in that the lifetime of the replaced member may not have been counted properly.

In the present embodiment, therefore, the threshold value for new-product detection is set beforehand at the same time as replacement detection. In the present embodiment, as described above K, at the time where the transfer roller resistance is at the upper limit, where the initial value of K is smallest, is herein K=0.040, and accordingly the threshold value for new-product detection (new-product detection threshold value in FIG. 6) was set to K≥0.035 taking into consideration the impact of measurement error.

In the present embodiment, specifically, the controlling unit compares the amount of change ΔK with a threshold value, and in addition thereto, compares the K-value itself with the threshold value, at each detection timing. Upon detection of ΔK≥0.010 and K≥0.035 at a given detection timing, it is determined that the roller has been replaced with a new one, and the lifetime counter is reset. That is, the new-product detection threshold value is a second threshold value. In a case where K is equal to or greater than the second threshold value, it is determined that the secondary transfer roller 11 has been replaced with a new one.

In a case by contrast where the transfer roller is replaced with a non-new transfer roller having a usage history, ΔK≥0.010 is detected and it is determined that the transfer roller has been replaced, but it cannot however be determined that the transfer roller has been replaced with a new one, since K≥0.035 is not satisfied. In a case where K is smaller than the second threshold value, thus, it is unclear whether or not the transfer roller has been replaced with a new one.

Even if the roller has been replaced with a new one, in some instances K may be smaller than the threshold value for new-product detection (i.e., K≥0.035 is not satisfied) at the time of slope acquisition immediately following replacement, depending on various situations (for instance, the usage environment and usage history of the image forming apparatus at the time of replacement, and the storage state of a new transfer roller for replacement). In such a case, replacement with a new product cannot be determined accurately.

The user may therefore be notified and be prompted, via an operation panel, to perform an operation in a case where, even upon detection of roller replacement, it is unclear whether or not the roller has been replaced with a new one correctly (in a case where ΔK≥0.010 and K<0.035 are detected, in the present embodiment). In the notification, for instance the user can be requested to reset the lifetime count in a case where the device has been replaced correctly with a new one.

Such being the case, the present embodiment allows avoiding a problem in which a lifetime count is reset despite the fact that the transfer roller has been replaced with a transfer roller that is not new but has a history of being used, and the problem where a counter cannot be reset, and the lifetime after replacement cannot be detected correctly, despite the fact that the roller has been replaced with a new one.

Figure 7:
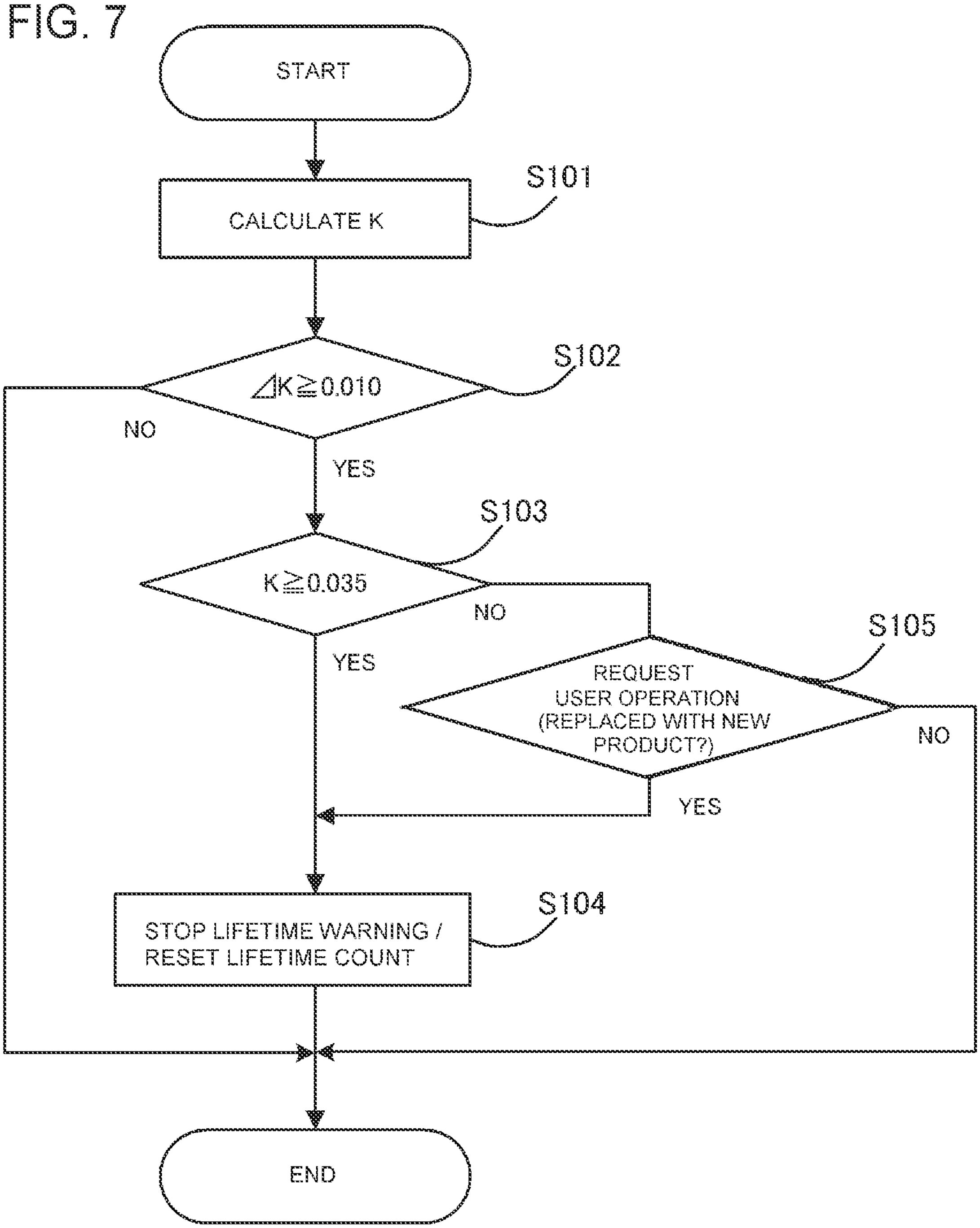
FIG. 7 is a flowchart for explaining one embodiment.

The flow of the present embodiment will be explained with reference to FIG. 7. The present flow starts at a predetermined timing during image formation. Firstly, the controlling unit calculates slope K on the basis of applied voltage and detected current (step S101), Next, the controlling unit calculates ΔK, as the amount of change in the slope K, and determines whether or not ΔK≥0.010 holds (step S102).

In a case Where ΔK<0.010 is detected (S102=No), the controlling unit determines that the roller has not been replaced, and terminates replacement detection. In a case by contrast where ΔK≥0.010 is detected (S102=Yes), the process proceeds to step S103. The controlling unit determines next whether or not K≥0.035 holds (step S103). In a case where K≥0.035 is detected (S103=Yes), the controlling unit determines that the roller has been replaced with a new one, stops a lifetime \Naming, resets the lifetime count, and terminates replacement detection (step S104).

In a case by contrast where K<0.035 is detected in step S103 (S103=No), the controlling unit notifies the user (step S105). In this notification the user is prompted to input either Yes/No via the operation panel, as to whether the roller has been replaced with a new one or not. If the input is Yes, the controlling unit stops a lifetime warning, resets the lifetime count, and terminates replacement detection (step S104). If the input is No, the controlling unit terminates replacement detection without taking further action. In this case the lifetime warning notification state is maintained, and the lifetime count is continued.

The tolerance range of the initial value of the slope K, the replacement determination value, and the threshold value of the new-product detection, explained above, are values determined beforehand on the basis of the formulation of the secondary transfer roller, and the configuration of the apparatus. When the formulation and apparatus configuration vary these values are calculated and set anew, for respective instances; therefore, these values may be set every time for each given situation.

An example has been explained herein in which the slope K pertaining to a current-voltage characteristic curve is calculated at the time of execution of ATVC during pre-rotation, but the slope K may also be calculated separately at some other timing. For instance, if the slope K is calculated separately from execution of ATVC, the detection time can be set to be longer than that at the time of ATVC, and the slope K can be calculated with greater precision.

As a result, it becomes possible to utilize a detection result determined through averaging processing, even in a state where the detected current exhibits periodic unevenness in the second half of durability.

The predetermined timing may be calculated by harmonizing the usage environment and operation conditions; in this case as well the predetermined timing can be calculated with greater precision while suppressing measurement variability.

An instance has been explained above with the secondary transfer roller 11 as a replaceable member, but the target of the present invention is not limited thereto. For instance, the invention may be applied to various roller members, such as a primary transfer roller and a transfer roller in a monochrome machine. When applied to a primary transfer roller, the invention can also be utilized for detecting replacement of an intermediate transfer unit as a replaceable unit that encompasses the primary transfer roller.

EMBODIMENT 3

In the present embodiment, a method will be explained in which a replacement detection means determines replacement of the transfer roller by detecting a change in an overshoot amount of detected current at the time of application of a high voltage at the start of image formation.

The transfer roller used in the present embodiment is characterized in that the resistance value of the member increases on account of energization deterioration over long periods of time that accompanies durability, as described above. Deterioration on account of energization denotes herein a phenomenon where for instance the roller surface oxidizes and deteriorates for example on account of discharge occurring between the transfer roller and a counter member (in this case between the transfer roller and a counter roller across a belt) when high voltage is applied. Such deterioration results in a gradual increase in resistance in the vicinity of the surface layer of a rubber layer, which is the conductive layer of the transfer roller; as a result, this gives rise to an increase in the overall resistance of the transfer roller, and to an increase in the detected resistance itself at the time of ATVC.

Figure 8A:
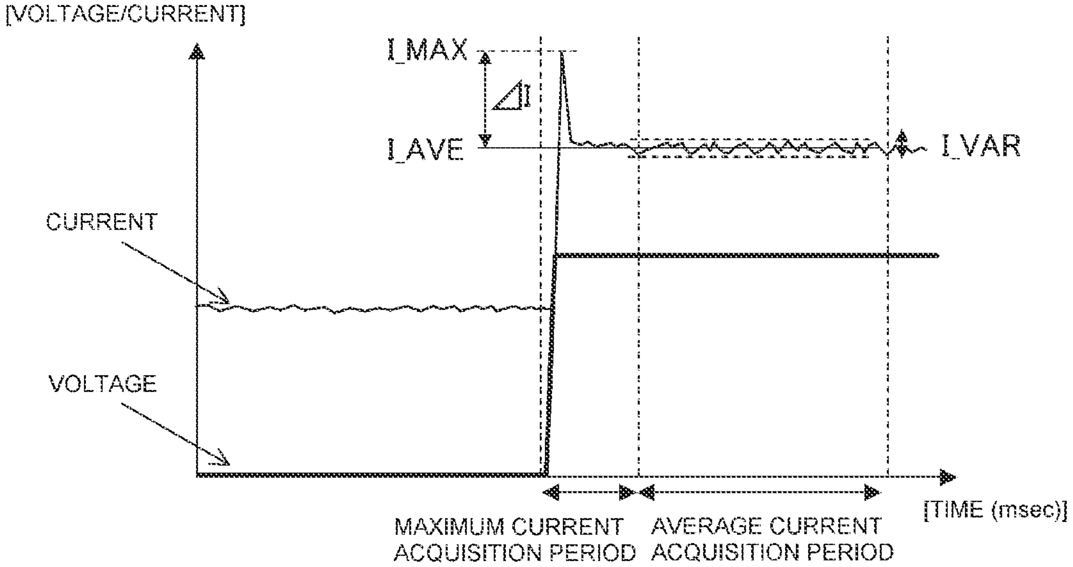
FIG. 8A and FIG. 8B are diagrams for explaining rising waveforms of voltage and current in one embodiment.
Figure 8B:
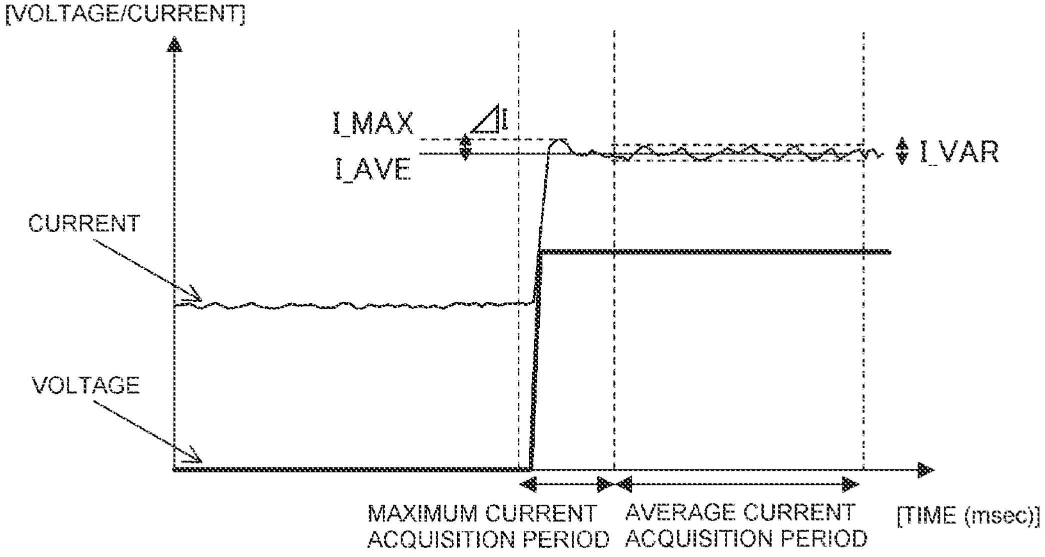

An explanation follows next on a rise in the detected current at the time of application of high voltage to a transfer roller, the resistance value of which has increased on account of energization deterioration derived from durability, and to the transfer roller in a new-product state. FIG. 8A and FIG. 8B are diagrams illustrating waveforms of high voltage application and detected current at the start of image formation for a new roller and for a roller after durability, respectively. The horizontal axis represents time. In the graphs, a straight thick solid line denotes applied voltage, and a wavy thin solid line denotes detected current. The vertical axis schematically represents voltage and current values. In the transfer rollers used herein, there are compared instances of a new roller and a roller after durability, in which detected resistance values at the time of ATVC are substantially identical.

As the figures reveal, current rise characteristics at the time of application of high voltage application are different from each other, for a new roller and a roller after durability, even though the detected resistances at the time of ATVC are substantially identical. Specifically, the new roller illustrated in FIG. 8A exhibits a current rise characteristic for application of voltage in the case of a single-layer roller in which the resistance in the thickness direction of the roller conductive layer is uniform. By contrast, the roller after durability illustrated in FIG. 8B exhibits a current rise characteristic of a so-called two-layer roller having a high resistance layer on the surface layer. Specifically, the new roller exhibits so-called overshoot, in which a current of significant value flows immediately after application of voltage. On the other hand, a time constant of the roller after durability increases significantly due to the influence of the high resistance layer on the surface, the responsiveness of the current rise characteristic with respect to application of voltage decreases, and the overshoot amount drops at the time where current rises.

An overshoot amount ΔI of the current at the time of a rise thereof is calculated, in accordance with Expression (3), on the basis of a maximum current I_MAX and an average current during a preset constant voltage application period from a constant voltage application timing at the time of ATVC.

$$\Delta I = I\_MAX - I\_AVE \tag{3}$$

In the present embodiment, the constant voltage application period at the time of execution of ATVC during pre-rotation was set to 300 msec. Each period was set as follows. The method for calculating the average current may involve working out the arithmetic mean of a current value acquired at a plurality of timings during an average current acquisition period. It suffices herein to work out a representative value of current during an overshoot-less period. For instance, a median value may be used instead of an average value.

Maximum current acquisition period (first predetermined period): from the constant voltage application timing up to 100 msec after the constant voltage application timing (100 msec period)

Average current acquisition period (second predetermined period): from 100 msec after the constant voltage application timing up to 300 msec after the constant voltage application timing (200 msec period)

In the present embodiment, rise applied voltage at the time of overshoot detection was set to 1 kV under a test environment of 23° C./50%. The current values in this case were as follows.

The values are I_MAX=34.50 μA and I_AVE=22.18 μA, for a new product.

Accordingly, ΔI=12.32 μA holds for a new product.

The values are I_MAX=22.43 μA and I_AVE=21.23 μA after durability.

Therefore, there holds ΔI=1.20 μA after durability.

Figure 9:
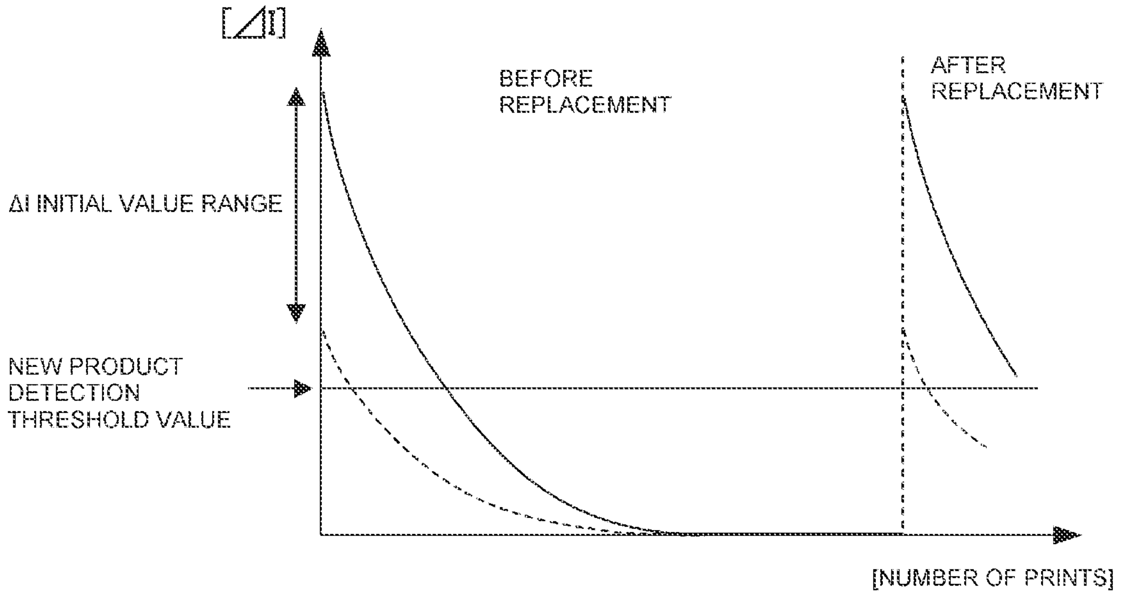
FIG. 9 is a diagram for explaining changes in overshoot amount in one embodiment.

FIG. 9 is a graph illustrating the durability evolution of ΔI and the changes in ΔI after replacement. In the figure the solid lines denote variation in the case of a product with lower-limit resistance in manufacturing tolerance and the dashed lines denote variation in the case of a product with upper-limit resistance in manufacturing tolerance. As can be seen here, ΔI exhibits a value within a predetermined range in an initial state (initial value range); then, ΔI decreases gradually on account of durability, such that in the second half of durability ΔI becomes substantially 0 (overshoot-less state), regardless of the range of ΔI in the initial state.

When a roller is replaced in such a state, ΔI varies significantly from substantially a zero state. In the present embodiment, therefore, whether a roller has been replaced or not is determined through detection of this change. Specifically, an amount of change between a first difference calculated at the first timing (difference between I_MAX and I_AVE at the first timing) and a second difference calculated at the second timing (difference between I_MAX and I_AVE at the second timing) is compared against a third threshold value.

In the present embodiment, there is set beforehand a threshold value ΔI_TH (third threshold value) for discriminating a new product. Herein ΔI_TH is set by calculating beforehand ΔI for the case where ΔI is smallest, i.e., for the case of a specification upper limit of the tolerance of the resistance value at the time of manufacture. Herein, AI for a new product with upper-limit resistance value is set in the manner below, with 1 kV as the rise applied voltage at the time of overshoot detection.

Herein there holds I_MAX=27.50 μA and I_AVE=21.20 μA for a new product.

Therefore, ΔI-6.30 μA holds for a new product.

Therefore, ΔI_TH=4.0 μA is set in the present embodiment, with detection errors factored in. That is, upon detection of ΔI≥4.0 μA (in a case where ΔI is equal or greater than the third threshold value) it is determined that the roller has been replaced with a new one, and the lifetime counter is reset.

Even when the transfer roller has been replaced with a new one the overshoot amount ΔI immediately following replacement may in some instances be smaller than the threshold value ΔI_TH for new-product detection determination (may be smaller than the third threshold value), depending on various situations (for instance the usage environment and usage history of the image forming apparatus at the time of replacement, and the storage state of a new transfer roller for replacement). Therefore, it is also preferable to set ΔI_TH2 as an auxiliary threshold value (fourth threshold value) for new-product detection.

Thus even if ΔI≥4.0 μA is not satisfied it is still possible to detect that a roller itself has been replaced, so long as a given amount of change is detected, although it may be unclear whether the roller has been replaced with a new one. Specifically, I_VAR is defined as a variation range resulting from subtracting a minimum value from a maximum value in an average current acquisition interval, as illustrated in FIG. 8A and FIG. 8B. Upon detection of replacement of the roller after the end of the lifetime thereof it is possible to determine at least that the roller may have been replaced, in a case where there is detected relationship between ΔI and the variation range I_VAR at the time of current detection such that ΔI>I_VAR/2 holds (in a case where ΔI is equal to or greater than a fourth threshold value). In this example I_VAR/2 was 1.15 μA. Therefore, ΔI_TH2=2.0 μA was set as the threshold value for replacement determination, taking detection errors into consideration.

In a case in the present embodiment where, as described above, even upon detection of transfer roller replacement it is not possible to detect that a value is equal to or greater than a threshold value for new-product detection determination, a notification to the user is displayed, on the operation panel, requesting a determination operation as to whether the roller has been replaced with a new one or not, without automatic execution of lifetime counter resetting, in a case where ΔI_TH2≤ΔI≤ΔI_TH, i.e. 2.0 μA≤ΔI<4.0 μA is detected. As a result, for instance the lifetime count can be reset correctly also in a case where the overshoot amount ΔI immediately following replacement is equal to or smaller than the threshold value ΔI_TH for new-product detection determination, regardless of the whether the roller has been changed to a new one.

Figure 10:
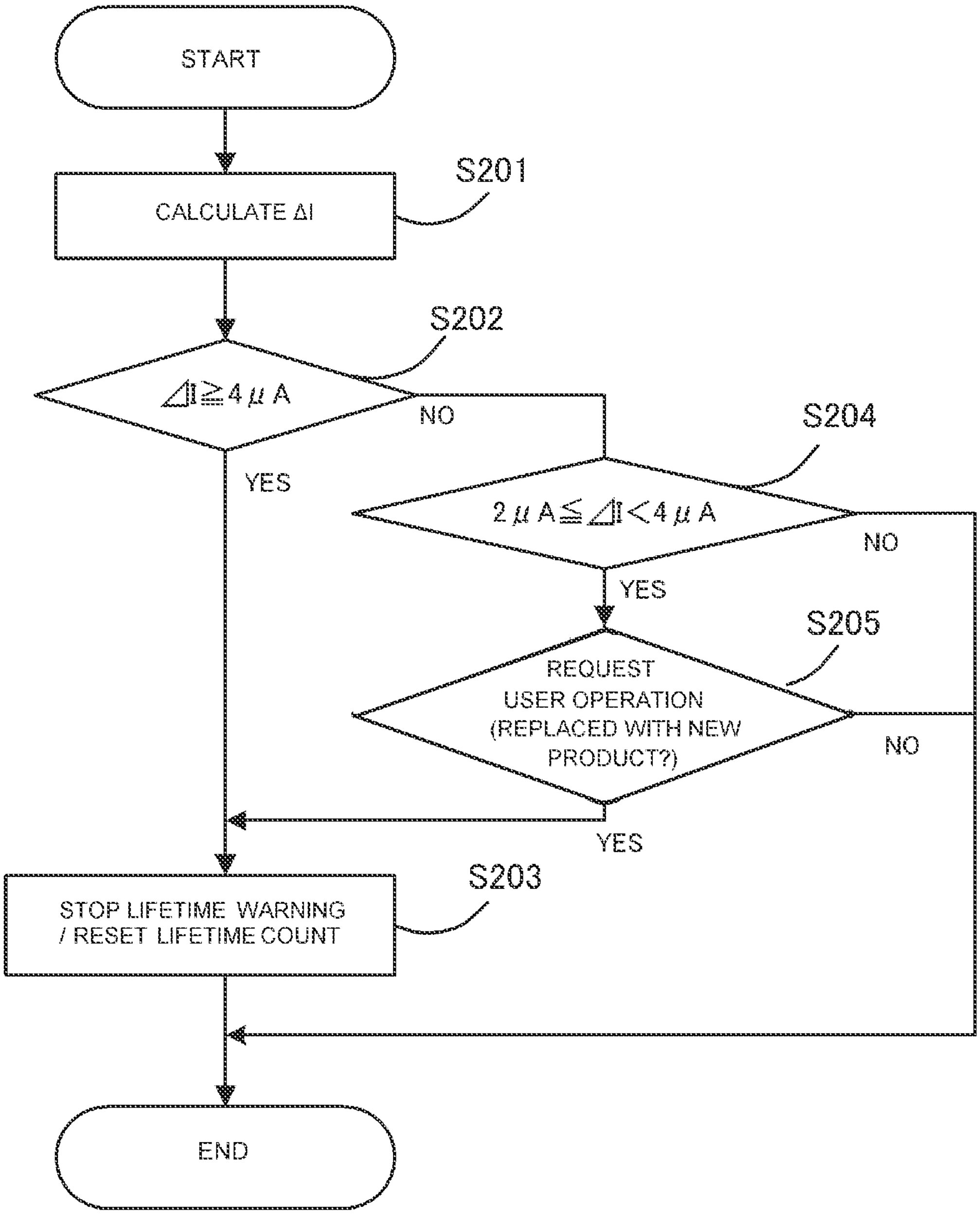
FIG. 10 is a flow diagram for explaining one embodiment.

The flow involved will be explained with reference to FIG. 10. The present flow starts at a predetermined timing at the time of image formation. Firstly, ΔI is calculated (step S201). Next it is determined whether ΔI≥4.0 μA holds or not (step S202).

If ΔI≥4 μA is detected (S202=Yes), the controlling unit determines that the roller has been replaced, stops a lifetime warning, resets the lifetime count, and terminates replacement detection (step S203). In a case by contrast where ΔI<4 μA is detected in step S202 (S202=No), the controlling unit determines whether or not 2 μA≤ΔI<4 μA holds (step S204).

In a case where ΔI<2 μA holds (S204=No), the controlling unit determines that the roller has not been replaced, and terminates the process. In a case by contrast where 2 μA≤ΔI holds (S204—Yes), the controlling unit notifies the user accordingly (step S205). In this notification the user is prompted to perform an operation of inputting either Yes/No, via the operation panel, as to whether the roller has been replaced with a new one or not In a case where the operation of the user in step S205 is "replaced (Yes)", the lifetime warning is stopped, the lifetime count is reset, and replacement detection is terminated (step S203). In a case by contrast where the user operation in step S205 is "not replaced (No)", replacement detection is terminated without any action being taken. In this case the lifetime warning notification state is maintained, and the lifetime count is continued.

Replacement of the transfer roller can thus be detected as a result of the above flow. It becomes thus possible to avoid the problem in which a lifetime count is reset despite the fact that the transfer roller has been replaced with a non-new transfer roller having a history of usage, and the problem where a counter cannot be reset, and the lifetime after replacement cannot be detected correctly, despite the fact that the transfer roller has been replaced with a new one.

The values of ΔI_TH and ΔI_TH2 used herein vary depending for instance on apparatus configuration, roller formulation, resistance values, voltage application conditions, measurement conditions, data acquisition timings and so forth; accordingly, the foregoing may be set every time. Also, environment information about the measurement environment, for instance temperature and humidity, may be measured, and a calculation expression of the relationship between ΔI and the environment may be worked out beforehand and used, or a correction table may be created, to then perform a correction.

In the present embodiment, an example of acquisition has been explained in which the acquisition period of the maximum current I_MAX and the average current I_AVE are divided into a maximum current acquisition period and an average current acquisition interval set beforehand. For the purpose of simplifying control, however, it is also possible to acquire the maximum current I MAX and the average current I_AVE at a same interval in the constant voltage application period, from after application of voltage until before the start of the transfer operation of the toner image.

Thus the present invention allows determining whether or not a member has been replaced even when the image forming apparatus lacks a member replacement detection mechanism. As a result, the lifetime count can be reset automatically, without the user performing a reset operation, upon determination that a member has been replaced.

Embodiment 4

In Embodiments 1 and 2, the slope of the current-voltage characteristic of the transfer roller is acquired, to determine whether the transfer roller has been replaced with a new one or not. A method for further improving determination precision will be explained in Embodiment 4 below.

As described above, the transfer roller used in the present embodiment suffers for instance oxidative deterioration on the roller surface, derived from energization, such that resistance in the vicinity of the surface layer or a rubber layer, which is the conductive layer of the transfer roller, increases gradually. Accordingly, the current-voltage characteristic of the transfer roller after durability behaves like a so-called two-layer roller having a high resistance layer on the surface layer.

That is, given the high resistance of the surface layer of a transfer roller after durability, the transfer roller is characterized in that, due to manufacturing tolerance, a voltage value at which current starts flowing in the roller is higher than that in a transfer roller exhibiting high resistance from the beginning. Even if the slopes of the current-voltage characteristic are similar in different usage environments at the time of ATVC execution for both rollers, it is however possible to discriminate between the rollers on the basis of features of such current-voltage characteristic.

Figure 11:
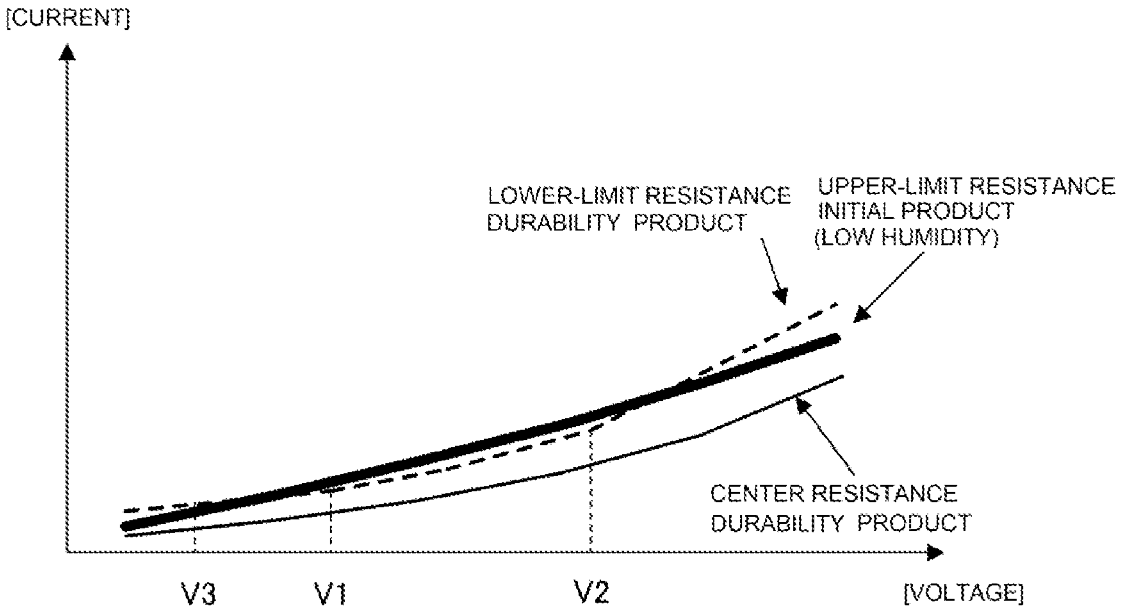
FIG. 11 is a graph illustrating a current-voltage characteristic curve pertaining to a transfer roller in one embodiment.

FIG. 11 is a graph illustrating current-voltage characteristic curves for three transfer rollers, where the horizontal axis represents voltage and the vertical axis represents current. The solid line denotes the profile of the current-voltage characteristic after durability for a medium-resistance product, and the dashed line denotes the profile of a lower-limit resist product. The thick line denotes the profile of the state of a new product with upper-limit resistance, resulting from execution of ATVC in an environment at a lower humidity than that for other rollers. A change in humidity between before and after replacement of the transfer roller is envisaged herein.

In a case where a transfer roller with upper-limit resistance is in a low-humidity environment, the resistance of the transfer roller increases and the current value decreases, even for a same applied voltage. Therefore, the profiles and slopes of the current-voltage characteristic after durability of the transfer roller with lower-limit resistance lie close to each other, and it may be difficult to distinguish between respective ones.

Therefore, a difference in the profiles of current-voltage characteristic between a new transfer roller and a roller after durability is utilized herein. As described above, the slope of the current value relative to voltage in the profile of the transfer roller with upper-limit resistance in a new product state does not vary that much between the low voltage side and the high voltage side. In the two transfer rollers after durability, by contrast, the slope on the high voltage side is larger than the slope on the low voltage side, and thus the transfer roller exhibits a profile different from that in a new product state.

An explanation follows next on a method for distinguishing between a new transfer roller and a transfer roller after durability, through comparison of the slope on the low voltage side and the slope on the high voltage side.

Firstly there are newly defined a voltage V3 on the low voltage side and a detected current I3 at the time of application of the voltage V3. In the present embodiment V3 is set as follows.

V3=500 V

Next, two types of slopes K1 and K2 are defined as follows, on the basis of V1 and V2 having been set in the Embodiment 1, and on the basis of the newly set V3. Slope K2 is identical to K defined in Embodiment 1.

$$K1=(V1-V3)/(I1-I3) \quad (4)$$

$$K2=(V2-V1)/(I2-I1) \quad (5)$$

A ratio a worked out from slope K1 and slope K2, for the purpose of determining a new transfer roller or a transfer roller after durability, is defined as follows.

$$a=K2/K1 \quad (6)$$

Lastly, the state of use of the transfer roller is determined by comparing the value of a with a threshold value for determining whether the transfer roller is new or not. In a case where the value of a is equal to or greater than the threshold value it is determined that the transfer roller is a transfer roller after durability, while in a case where the value of a is equal to or smaller than another threshold value, it is determined that the transfer roller is a new one.

Specifically, Table 1 sets out values of slopes K1 and K2 worked out from the profile of the current-voltage characteristic in FIG. 11, and the values of a worked out from the two slopes, for three transfer rollers,

TABLE 1

| TRANSFER ROLLER | HUMIDITY | K1 | K2 | a |
|---|---|---|---|---|
| AFTER DURABILITY/ LOWER-LIMIT RESISTANCE | ORDINARY HUMIDITY | 0.019 | 0.03 | 1.58 |
| AFTER DURABILITY/ CENTER RESISTANCE | ORDINARY HUMIDITY | 0.015 | 0.024 | 1.60 |
| NEW PRODUCT/ UPPER-LIMIT RESISTANCE | LOW HUMIDITY | 0.027 | 0.033 | 1.22 |

Figure 12:
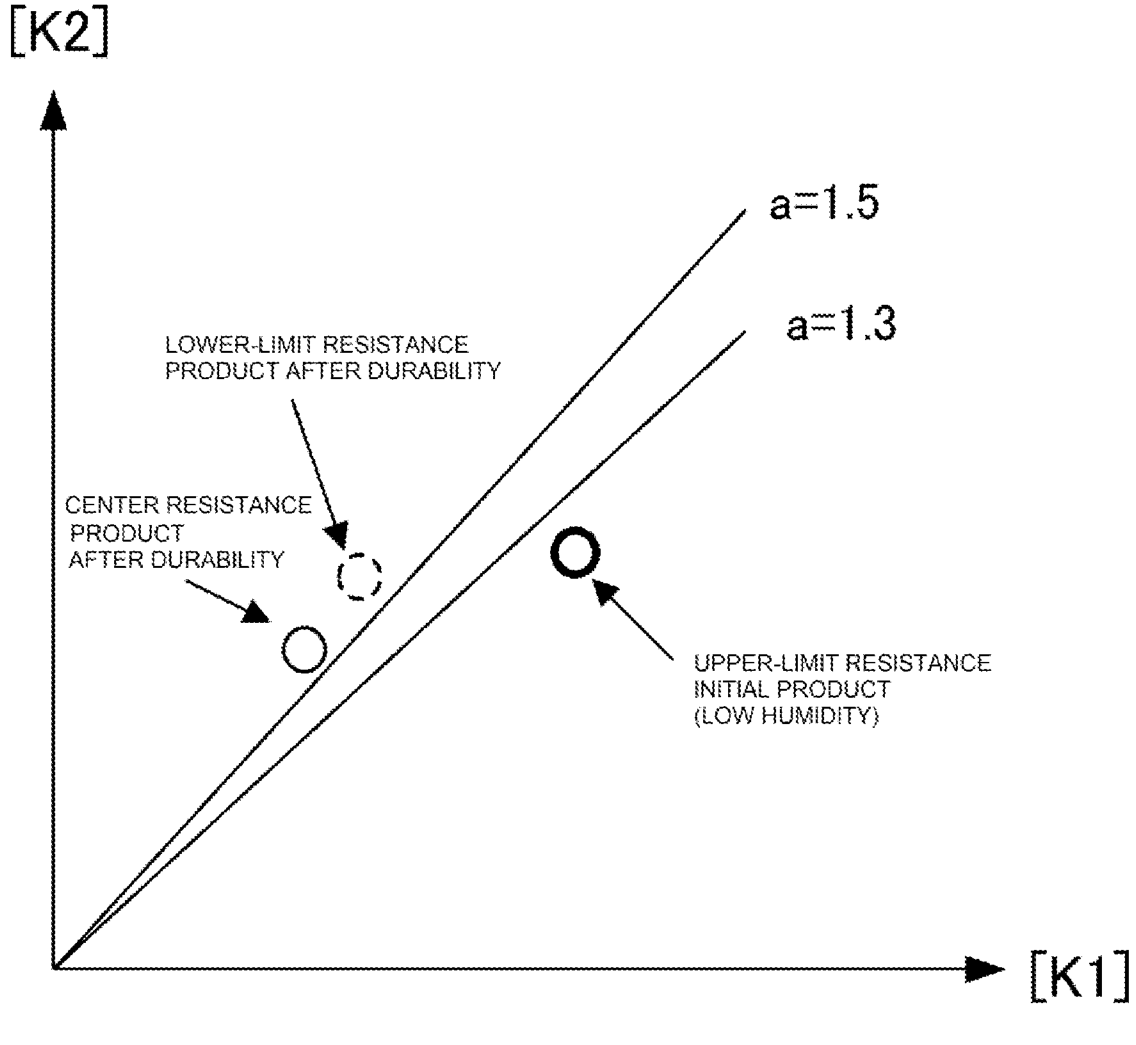
FIG. 12 is a graph illustrating two types of slopes of a current-voltage characteristic curve in one embodiment.

FIG. 12 is a graph illustrating the relationship between two types of slopes of current-voltage characteristic curves of the transfer rollers, where the horizontal axis represents the value of K1 and the vertical axis represents the value of K2. FIG. 12 plots the values of K1 and K2 for the three transfer rollers. The solid-line point denotes a roller having center resistance after durability, the broken-line point denotes a roller having lower-limit resistance after durability, and the thick-line point denotes an initial roller having upper-limit resistance in a low-humidity environment.

The transfer rollers after durability have a relatively large K2 value with respect to the value of K1, and are plotted in the upper left area, By contrast, the new transfer roller has a relatively small K2 value with respect to the value of K1 value, and is plotted in the lower right area.

FIG. 12 illustrates relationship between K1 and K2 such that the value of a, which is the ratio of K1 and K2, takes on values of 1.3 and 1.5, in respective instances. Both rollers after durability exhibited values greater than a=1.5, whereas the new roller exhibited a value smaller than 1.3. Therefore, a post-durability threshold value for determining that a transfer roller is a transfer roller after durability was set to 1.5, while a new-product threshold value for determining that a transfer roller is a new transfer roller was set to 1.3. Whether a transfer roller is a new one or a transfer roller after durability is discriminated on the basis of a comparison versus these two threshold values.

Such new-product determination for a transfer roller can be used for detecting replacement of a transfer roller. In the present embodiment, specifically, the controlling unit calculates an a-value for each detection timing, and in a case where "a previously calculated a-value (a0) is equal to or greater than the post-durability threshold value" and a "currently calculated a-value (a1) is equal to or smaller than the new-product threshold value", it is determined that a transfer roller after durability has been replaced by a new transfer roller, and the lifetime counter is reset automatically.

The effect of the present embodiment is as follows. Results have been illustrated pertaining to instances of replacement determination in accordance with various methods, for a case where a medium-resistance product after durability is replaced with an upper-limit resistance new product (low humidity state), and for a case in which a lower-limit resistance product after durability is replaced with an upper-limit resistance new product (low humidity state).

In the method of the present embodiment it is determined whether a transfer roller is a new transfer roller or a transfer roller after durability, depending on the value of the ratio of a slope on a low voltage side and a slope on a high voltage side; and on the basis of the obtained result, it is then determined whether the transfer roller has been replaced or not. Table 2 below sets out results of replacement determination.

TABLE 2

| BEFORE REPLACEMENT | AFTER REPLACEMENT | PRESENT EMBODIMENT a0 | a1 | DETERMINATION |
|---|---|---|---|---|
| AFTER DURABILITY; LOWER-LIMIT RESISTANCE; ORDINARY HUMIDITY | NEW PRODUCT; UPPER-LIMIT RESISTANCE; LOW HUMIDITY | 1.58 (>1.5) | 1.22 (<1.3) | REPLACED |
| AFTER DURABILITY; CENTER RESISTANCE: ORDINARY HUMIDITY | NEW PRODUCT; UPPER-LIMIT RESISTANCE: LOW HUMIDITY | 1.6 (>1.5) | 1.22 (<1.3) | REPLACED |

As the results of Table 2 reveal, in the present embodiment a replacement determination could be performed in that, in both cases, a roller before replacement was determined to be a roller after durability, and a roller after replacement was determined to be a new one. That is, the configuration in the present embodiment allows determining with good precision whether a roller has been replaced, even when temperature or humidity differs between before and after replacement.

As described above, the present embodiment allows determining whether a transfer roller is a new one or a transfer roller after durability on the basis of a comparison of an a-value worked out from slopes of two or more levels, and a threshold value. By comparing then the result of this determination with a previous determination result, it becomes possible to determine whether the transfer roller has been replaced with a new one or not. Various values and settings used for control, for instance, in terms of set values of applied voltage and the method for calculating the a-value, may be established as appropriate, for instance, depending on member characteristics and the environment of the apparatus. Values, expressions, tables and so forth used for control, and calculated on the basis of results of measurements carried out beforehand, may be stored, for instance, in the memory of the control board 25.

In the present embodiment, three voltage values, V1 through V3, have been set for slope determination, and two slopes pertaining to current-voltage characteristic were worked out. The method for working out the slopes is not limited thereto, and, for instance, there may be set four or more voltage values, such that on the basis of the results, two or more slopes may be worked out that are then used for determination.

Also, in the present embodiment, determination and replacement of new/old rollers has been performed on the basis of an index value calculated from the result of one measurement; however, the index value may be calculated through statistical treatment of multiple measurements.

In the present embodiment, two types of threshold values were set for comparison with values worked out from slopes of two or more levels, and the rollers were determined to be a new roller or a roller after durability. The threshold value is not limited thereto, and there may be set just one threshold value. For instance, a transfer roller may be determined to have been replaced in a case where a threshold value was exceeded in a previous measurement, but the threshold value is not exceeded in a current measurement.

By relying on changes in the profile of a current-voltage characteristic derived from energization deterioration, the present invention allows determining whether a member of an image forming apparatus has been replaced or not also in a case where the image forming apparatus lacks a member replacement detection mechanism. As a result, a lifetime count can be automatically reset, without the user performing a reset operation, in a case where it is determined that a member has been replaced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-038208, filed on Mar. 11, 2022, and Japanese Patent Application No. 2022-200574, filed on Dec. 15, 2022, which are hereby incorporated by reference herein in their entirety.

What is claimed is:

1. An image forming apparatus, comprising:

a replaceable roller member;

an applying unit configured to apply a voltage to the roller member;

a current detecting unit configured to detect a current flowing in the roller member to which the voltage is applied; and a controlling unit capable of calculating a value of a slope of a current-voltage characteristic of the roller member on the basis of a first current detected when a first voltage is applied to the roller member, and a second current detected when a second voltage is applied to the roller member, wherein the controlling unit is configured to determine that the roller member has been replaced when an amount of change from a value of a first slope calculated at a first timing to a value of a second slope calculated at a second timing later than the first timing is equal to or greater than a first threshold value, and when the value of the second slope is equal to or greater than a second threshold value.

2. The image forming apparatus according to claim 1, wherein the first threshold value of the amount of change is set on the basis of a difference between an upper limit of a range of the value that the slope can take in a case where the roller member has reached the end of the lifetime thereof and a lower limit of the range of the value that the slope can take in a case where the roller member is a new one.

3. The image forming apparatus according to claim 1, wherein the controlling unit prompts a user to perform an operation pertaining to whether or not the roller member has been replaced with a new one in a case where the value of the slope for a case where the roller member is determined to have been replaced is less than the second threshold value.

4. The image forming apparatus according to claim 1, wherein the second threshold value of the value of the slope is set on the basis of a lower limit of the range of the value that the slope can take in a case where the roller member is a new one.

* * * * *